Figure 1:
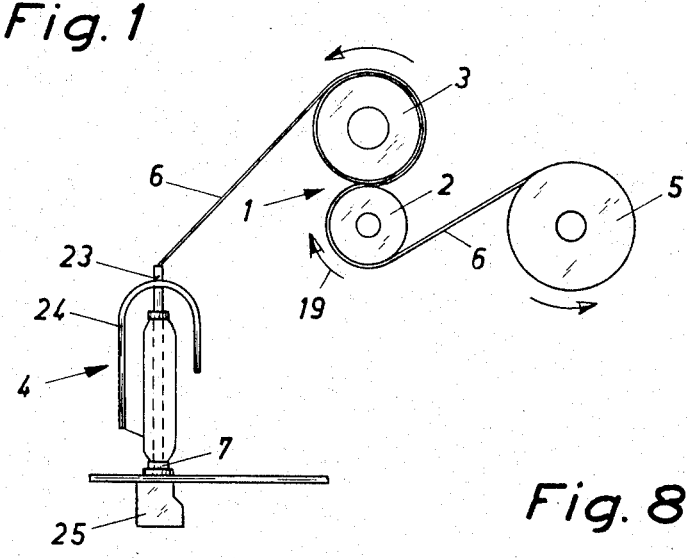

Dec. 5, 1967  N. J. NILSON  3,355,866
APPARATUS FOR MAKING YARN FROM PLASTIC STRIPS
Filed Aug. 27, 1964  3 Sheets-Sheet 1

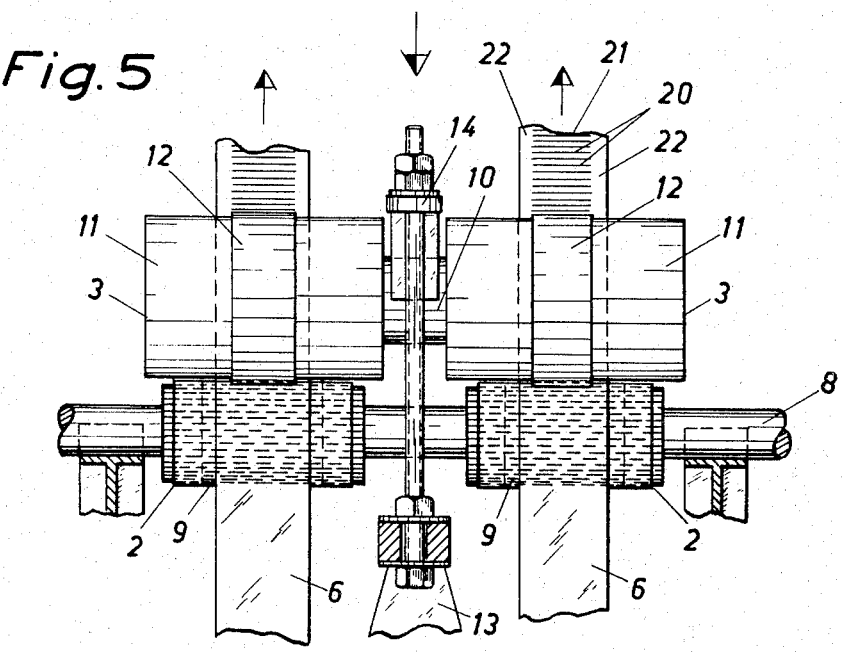
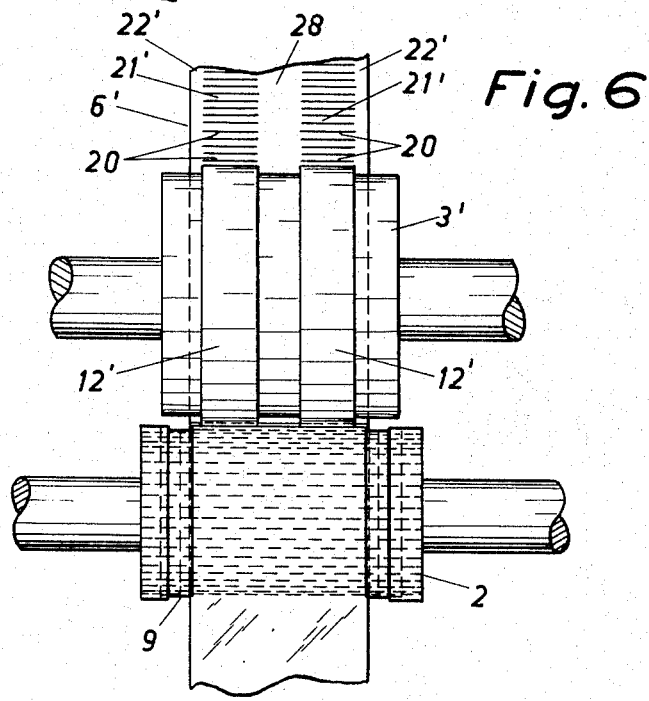

United States Patent Office 3,355,866
Patented Dec. 5, 1967

3,355,866
APPARATUS FOR MAKING YARN FROM PLASTIC STRIPS
Nils Josef Nilson, Prastgatan 19, Varberg, Sweden
Filed Aug. 27, 1964, Ser. No. 392,553
Claims priority, application Sweden, Aug. 28, 1963, 9,353/63
5 Claims. (Cl. 57—31)

It is known to use plastic strips having crosswise extending slots as weft in carpets. Before the weaving the strips are twisted in such a way that the band portions between the slots extend outside a longitudinal core. These projecting band portions will in the manufactured carpet extend up from the carpet bed in the same manner as on a heavy pile carpet or a hooked rug. The cutting of the slots of the plastic strips has hitherto caused many difficulties. The cutting apparatus—earlier being provided with blades—have turned out to be worn out rather quickly and thus the blades have required a regrinding at short intervals. The feed rate of the plastic strips has been rather small.

A first object of the present invention is to overcome these drawbacks. According to the invention the slots are cut in the strips by means of embossing of the same by the strips being fed between two rotating rollers pressed against each other, one of said rollers being smooth and the other one being provided with longitudinal steel rods arranged on its mantle surface, the strips thereupon preferably being twisted so as to be given a thread-shaped core having projecting, strip-shaped loops comprising the strip material between the slots. The feeding rate in this method can be very high and any notable wearing of the steel rods cannot be seen even after a long time of operation.

According to a suitable embodiment the slots are cut out in one or several longitudinal fields with uninterrupted lateral fields at the longitudinal borders of the plastic strips. At the twisting of such a plastic strip the uninterrupted lateral fields will form a longitudinal core from which the portions of the plastic strips situated between the slots will extend as loops out from the core along a helical line the pitch of which is depending on the degree of twisting of the strip.

The invention has reference also to an apparatus for carrying said method into effect. The main feature of the apparatus according to the invention is to be seen in two rotational rollers to be pressed against each other, one of said rollers being smooth and the other one at its mantle surface provided with longitudinal steel rods. The steel rods which may comprise common sewing-needles, are preferably laid into notches in the mantle surface of one of the rollers and are kept there such that they can be moved neither radially nor axially on the roller.

Further, the invention has reference to strips manufactured according to the method set forth in the aforegoing. The strips can be used as weft and/or warp at the manufacture of carpets and other fabrics. As material in the strips it is advisable to use a polyvinylchloride. The thickness of the strips can with advantage be chosen from 0.05 to 0.1 mm. As an example of a suitable width of the strips may be mentioned 20–30 mm. When they are intended to be used for the manufacture of carpets.

Figure 8:
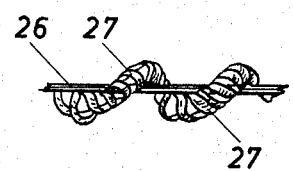
Figure 7:
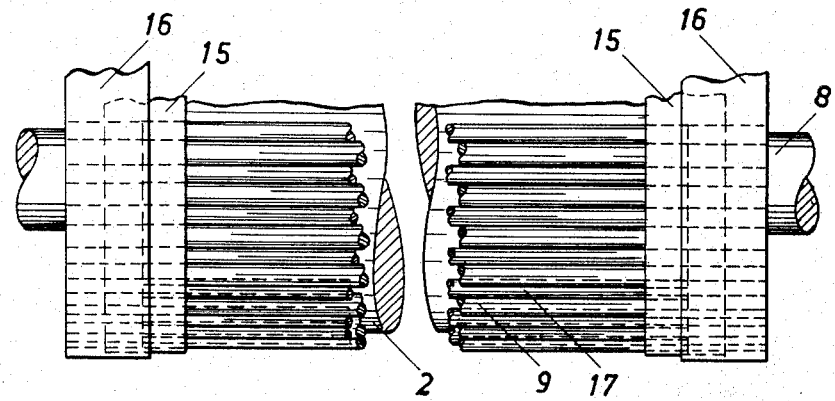
Figure 2:
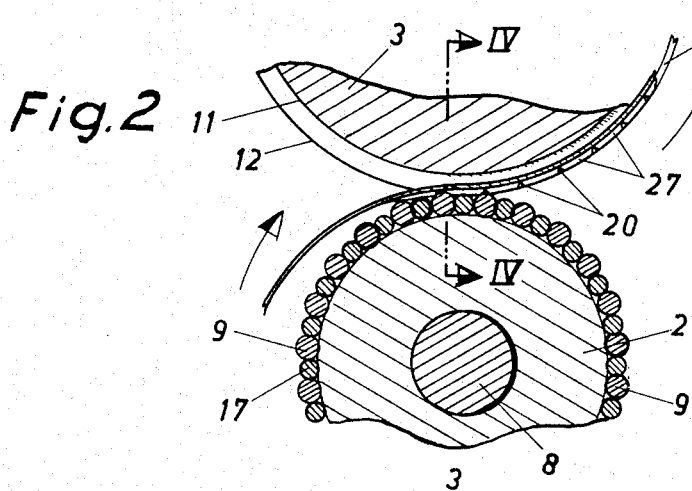
Figure 3:
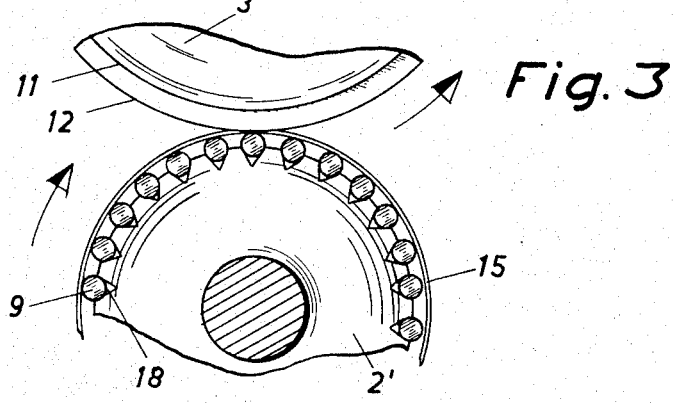
Figure 4:
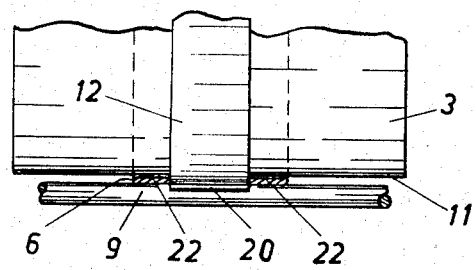

Further details of the invention will be obvious from the following description with reference to the accompanying drawings. In the drawings:

FIG. 1 shows diagrammatically a side elevation of an apparatus for cutting slots extending crosswise in a plastic strip and a device for the twisting of the same and its winding on a bobbin, FIG. 2 shows on an enlarged scale a cross section through the rollers of the slotting apparatus according to a preferred embodiment, FIG. 3 shows a similar cross section but according to another embodiment, FIG. 4 shows a vertical cross section on the line IV—IV in FIG. 2 through the shown roller pair and the plastic strips at the cutting place, FIG. 5 is a front elevation of a cutting apparatus according to the invention, FIG. 6 is a front elevation of one of the roller pairs in the cutting apparatus but according to another embodiment of the invention, FIG. 7 shows on an enlarged scale an embodiment of the roller provided with steel rods, and FIG. 8 is a side elevation of a part of a plastic strip according to the invention twisted by means of the apparatus in FIG. 1.

The cutting apparatus 1 shown diagrammatically in FIG. 1 comprises two rollers 2 and 3 one of which, viz, the roller 2, is rotated and the other one, i.e. the roller 3 which has a ground mantle surface comprises a loading roller. The apparatus also comprises a device 4, namely, a twisting spindle, for twisting the plastic strip 6 coming from a store bobbin 5 and for winding the same on the bobbin 7 after it has been provided with cross-wise directed slots in the cutting apparatus 1.

As obvious from FIG. 5 the cutting apparatus may comprise two rollers 2 attached to one and the same rotated shaft 8, each one of said rollers 2 provided at its periphery with a number of longitudinal steel rods 9. Two loading rollers 3 arranged on one and the same shaft 10 are pressed against the steel rods 9 of the rollers 2, a peripherally extending pressing portion 12 extending from the periphery 11 of said rollers 3. The rollers 3 are loaded by means of weights 13 on an adjustable lever 14. The loading can, however, be obtained by means of springs.

The steel rods 9 may—as shown in FIGS. 2 and 7—be arranged directly on the roller 2 close to each other and be kept at the ends by means of tapes 15, 16, e.g. coated fabric, said tapes being wound about the roller 2. A steel rod 17 having a smaller diameter than the diameter of the rods 9 are preferably inserted between two steel rods 9 neighbouring each other.

According to the embodiment shown in FIG. 3 the roller 2 is provided with longitudinal slots 18 in each one of which there is inserted a steel rod 9. Also these rods are at the ends retained against the roller 2' by means of tapes 15.

When the plastic strip 6 from the store bobbin 5 is fed in the direction of the arrow 19 in FIG. 1 over the roller 2, in through the press nip between this roller and the loading roller 3, there is obtained an embossing through the strip 6 at the places where the rods 9 are pressed against the press portion 12 on the loading roller 3 in question. It is thereby obtained slots 20 extending in cross-wise direction of the strip 6 in its longitudinal central field 21 whilst the lateral fields 22 are left uninfluenced as they extend on either side of the press portion 12 of the roller 3 in question. After the cutting operation the plastic strip 6 is brought over the loading roller 3 to the twisting apparatus 4 where the strip is fed through an axial tube piece 23 on a rotated hollow winding arm 24 which in a manner known per se during its rotation is lifted and lowered by means of a driving device 25 shown only diagrammatically. The bobbin 7 is driven with an even higher speed than the winding arm 24. Due to the fact that the plastic strip 6 is fed along a portion of the periphery of the loading roller 3, it is guided in such a way that it is prevented from being twisted while in the press nip. Thus, the strip is there kept straight. At the twisting the strip 6 is wound in such a way that the lateral fields 22 form a thread-shaped core 26 (FIG. 8). From this one the portions 27 of the strip 6 remaining between the slots 20 extend as loops outwards along a helical line.

These loopy plastic strip portions 27 will then extend up from the carpet bed after the finishing of the carpet. The strips prepared as described in the aforegoing are in first hand intended to be used as weft yarns but can also be used as warp yarns.

In FIG. 6 there is shown a cutting apparatus the loading roller 3' of which is provided with two press portions 12' which during the cutting operation are both pressed against the steel rods 9 on the roller 2. A plastic strip 6' which passes the press nip between these two rollers 2 and 3' will be provided with two fields 21' having slots extending in cross-wise direction and is given besides the two uninterrupted lateral fields 22' also an uninterrupted central field 28.

The shown and described embodiments are to be regarded as examples and the different parts of the cutting apparatus as well as of the twisting apparatus may be modified in many ways within the scope of the appended claims. The number of the fields 21 with slots 20 extending in the cross-wise direction is independent of the invention. The same is true also for the plastic material, its dimensions and the arrangement of the slots 20. The steel rods may be entered with their ends into retaining rings on the roller 2.

What I claim is:

1. Apparatus for forming transverse slots in a plastic strip, and subsequently twisting the resultant slotted strip comprising means for forming said slots in combination with twisting means for receiving and twisting the resultant slotted strip, said means for forming said slots comprising a first rotatable roll and a second rotatable roll, each of said rolls having a mantle and said rolls being adapted to be pressed against each other, the surface of the mantle of the first roll being smooth, and rods mounted on the surface of the mantle of the second roll.

2. Apparatus according to claim 1, in which the surface of the mantle of the second roll is provided with elongated notches, said rods being positioned in said notches.

3. Apparatus according to claim 1, further comprising tapes arranged around the surface of the mantle of the second roll and retaining the rods on the second roll.

4. Apparatus according to claim 2, further comprising tapes arranged around the surface of the mantle of the second roll and retaining the rods on the second roll.

5. Apparatus according to claim 1, in which the twisting means is a twisting spindle.

References Cited

UNITED STATES PATENTS

| | | | |
|---|---|---|---|
| 336,149 | 2/1886 | Noyes | 57—143 X |
| 360,000 | 3/1887 | Darnall | 57—143 |
| 771,130 | 9/1904 | Deen | 28—18 |
| 1,777,076 | 9/1930 | Cumfer | 264—154 |
| 2,522,154 | 9/1950 | Asmussen | 83—346 X |
| 2,628,681 | 2/1953 | Kane | 83—346 |
| 2,766,504 | 10/1956 | Beeby | 28—72 |
| 2,867,890 | 1/1959 | Baxter | 28—72 |
| 2,896,397 | 7/1959 | Steen | 57—154 |
| 3,091,898 | 6/1963 | Fasold et al. | 18—19 X |
| 3,209,633 | 10/1965 | Doerman | 83—346 |
| 3,226,458 | 12/1965 | Graff et al. | 18—19 X |

FOREIGN PATENTS 4,908  1906  Great Britain.

FRANK J. COHEN, *Primary Examiner.*

J. PETRAKES, *Examiner.*